United States Patent [19]

Strong et al.

[11] Patent Number: 5,526,633
[45] Date of Patent: Jun. 18, 1996

[54] LAWN MOWER HAVING IMPROVED DECK HEIGHT ADJUSTMENT MECHANISM

[75] Inventors: David S. Strong, Battersea; Richard P. Rosa; Ronald A. Jackson, both of Brockville; Stephen B. Hunter, Cardinal; Brian S. Burnett, Mallorytown, all of Canada

[73] Assignee: Black & Decker Inc., Newark, Del.

[21] Appl. No.: 289,452

[22] Filed: Aug. 12, 1994

[51] Int. Cl.⁶ .................................................. A01D 34/74
[52] U.S. Cl. ........................................ 56/17.2; 280/43.13
[58] Field of Search ................................. 56/17.2, 17.1, 56/17.5; 280/43.13, 43.17

[56] References Cited

U.S. PATENT DOCUMENTS

| | | |
|---|---|---|
| 1,218,681 | 3/1917 | Millar . |
| 1,453,944 | 4/1923 | Pedroarena . |
| 2,263,368 | 11/1941 | Sejkora ............................ 56/17.2 X |
| 2,568,822 | 9/1951 | Pervis ............................... 56/17.2 |
| 2,671,299 | 3/1954 | Orr .................................... 56/17.2 |
| 2,709,602 | 5/1955 | Orr, Sr. . |
| 2,728,582 | 12/1955 | Knarzer . |
| 2,776,844 | 1/1957 | Wilkin . |
| 2,791,437 | 5/1957 | Knarzer . |
| 2,848,859 | 8/1958 | Abel . |
| 2,909,884 | 10/1959 | Knarzer ........................... 56/17.2 X |
| 2,915,318 | 12/1959 | Chesser ............................ 56/17.2 X |
| 2,948,544 | 8/1960 | Rowe et al. . |
| 2,986,402 | 5/1961 | Winton . |
| 3,190,061 | 6/1965 | Gilbertson . |

(List continued on next page.)

FOREIGN PATENT DOCUMENTS

| | | |
|---|---|---|
| 0047502 | 2/1985 | European Pat. Off. . |
| 0459638A1 | 12/1991 | European Pat. Off. . |
| 0355365B1 | 1/1994 | European Pat. Off. . |
| 0498294B1 | 10/1994 | European Pat. Off. . |
| 762735 | 4/1934 | France . |
| 7818721 | 8/1979 | Germany . |
| 2604609 | 2/1981 | Germany . |
| 3627208C1 | 11/1988 | Germany . |
| 8811157.1 | 6/1989 | Germany . |
| 3627208C2 | 4/1990 | Germany . |
| 4238414A1 | 6/1993 | Germany . |

OTHER PUBLICATIONS

MEP Tivoli Instruction Manual.
MEP Price List dated 1986.

*Primary Examiner*—Stephen J. Novosad
*Attorney, Agent, or Firm*—Harness, Dickey & Pierce

[57] ABSTRACT

A lawn mower having a deck height adjustment mechanism for simultaneously adjusting a height of a deck of a lawn mower at all four wheels of the lawn mower by the use of a single hand of the operator. The mechanism includes an index plate having a plurality of teeth thereon defining a plurality of deck height positions, and therefore a plurality of height positions of a cutting blade supported by the deck. The index plate is fixedly secured to an offset rear axle. An engaging plate having a pawl is coupled to an actuating member which is slidably, vertically moveable relative to the deck when the operator grips the actuating member and pulls upwardly away from the deck, while resting a palm of the same hand on a palm rest portion of the mechanism. A linkage member couples the index plate to a bracket of an offset front axle positioned at a front end of the deck. The operator adjusts the height of the deck relative to a ground surface by pulling upwardly with the fingers of one hand on the actuating member, while resting the palm of the same hand on the palm rest. This causes the engaging plate, and thus the pawl thereon, to be drawn out of engagement with the teeth of the index plate. The operator, while holding the actuating member engaged, may either pull upwardly with the same hand, thus raising the entire deck of the mower, or may urge the deck into a lower position. Movement of the index plate causes a simultaneous rotational movement of the offset front axle. Thus, all four corners of the deck are caused to be raised or lowered simultaneously as the operator either lifts or lowers the deck while engaging the actuation member.

21 Claims, 6 Drawing Sheets

U.S. PATENT DOCUMENTS

| | | |
|---|---|---|
| 3,226,920 | 1/1966 | Gilbertson . |
| 3,269,100 | 8/1966 | Smith . |
| 3,292,351 | 12/1966 | Larson et al. . |
| 3,357,715 | 12/1967 | Plamper et al. . |
| 3,577,714 | 5/1971 | Dahl . |
| 3,677,574 | 7/1972 | Cyr . |
| 3,802,173 | 4/1974 | Opitz ................................ 56/17.2 X |
| 3,874,151 | 4/1975 | Seifert et al. . |
| 3,972,160 | 8/1976 | Boswell . |
| 4,006,580 | 2/1977 | Kalleicher .............................. 56/17.2 |
| 4,167,093 | 9/1979 | Pfeiffer et al. . |
| 4,205,512 | 6/1980 | Thorud . |
| 4,785,612 | 11/1988 | Morishita et al. . |
| 4,825,548 | 5/1989 | Driggers . |
| 4,835,952 | 6/1989 | McLane . |
| 4,905,463 | 3/1990 | Eilles ...................................... 56/17.2 |
| 5,065,568 | 11/1991 | Braun et al. . |
| 5,142,850 | 9/1992 | Patterson et al. . |
| 5,163,275 | 11/1992 | Hare et al. . |
| 5,230,208 | 7/1993 | Hess et al. . |
| 5,241,810 | 9/1993 | Reichen . |
| 5,251,429 | 10/1993 | Minato et al. . |
| 5,259,175 | 11/1993 | Schmidt .................................. 56/17.2 |
| 5,398,489 | 3/1995 | Oshima ................................... 56/17.2 |

FIG. 3.

LAWN MOWER HAVING IMPROVED DECK HEIGHT ADJUSTMENT MECHANISM

CROSS-REFERENCE TO RELATED APPLICATIONS

The subject matter of the present application is related to U.S. patent application Ser. No. 29/027,102, filed Aug. 12, 1994, and entitled "Design: Lawn Mower", assigned to the assignee of the present application; and U.S. patent application Ser. No. 08/289,453, filed Aug. 12, 1994, and entitled "Lawn Mower Having Improved Handle To Deck Coupling Arrangement", assigned to the assignee of the present application.

U.S. patent application Ser. No. 08/383,755, filed Feb. 2, 1995, and entitled "Mulching Lawnmower Having Volute Deck", assigned to the assignee of the present application.

BACKGROUND OF THE INVENTION

1. Technical Field

This invention relates to lawn mowers, and more particularly to a lawn mower having a height adjustment mechanism for enabling an operator to adjust the height of a deck of a lawn mower relative to a ground surface at all the wheels of the lawn mower simultaneously by temporarily, manually engaging a single actuating member.

2. Discussion

Some form of deck height adjustment is common with virtually all lawn mowers. Typically, such deck height adjustment mechanisms incorporate an independent adjusting plate at each one of the four wheels of the mower. Some manually engageable release member is typically associated independently with each one of the adjusting plates and releasably engageable with its associated adjusting plate. Each adjustment plate, in turn, is usually fixedly secured to a portion of an offset axle supporting the wheel associated with the particular adjusting plate. When the release member is engaged, the offset portion of the axle is allowed to rotate which allows the vertical height of the wheel to be adjusted relative to the deck. Releasing the release member causes it to engage the adjusting plate, thus maintaining the adjusting plate stationary, and thereby maintaining the wheel at the desired position relative to the deck. By thus controlling the relative position of the wheel of the deck, the cutting height of the lawn mower blade can be adjusted relative to the ground.

While the above arrangement has proved to be satisfactory for allowing the deck height of the mower to be adjusted relative to the ground surface at all four corners (i.e., wheels) of the lawn mower deck, this arrangement does provide for some inconvenience to the operator. To adjust the deck height, the operator must manually adjust the position of each adjustment plate, and thus each wheel, relative to the deck. Since four wheels are typically employed with most lawn mowers, the operator must typically make four independent deck height adjustments, one at each wheel of the mower, when the deck height is to be raised or lowered.

More recently, improvements have been made to simplify the matter in which the deck of a lawn mower is adjusted to provide a greater degree of convenience to the operator. The assignee of the present application has utilized a form of deck height adjustment mechanism in which the operator is able to adjust the deck height of a mower relative to a ground surface by engaging a single deck height adjustment control. This system is embodied in a lawn mower manufactured by the assignee of the present application, and is disclosed in U.S. Pat. No. 5,230,208. The disclosure of this patent is hereby incorporated by reference into the present application. While the deck height adjustment mechanism disclosed in this patent has proved effective for increasing the ease with which the operator may adjust the deck height, it would be desirable to provide a mechanism which is even simpler and even less costly to manufacture, and which requires a fewer number of independent component parts to accomplish simultaneous adjustment of the deck height at all four wheels of the mower.

Accordingly, it is an object of the present invention to provide a deck height adjustment mechanism for a lawn mower which allows an operator of the lawn mower to easily and conveniently adjust the height of the deck at all four wheels of the lawn mower simultaneously. More specifically, it is an object of the present invention to provide a deck height adjustment mechanism by which all four wheels of a lawn mower may be simultaneously adjusted for height relative to the deck of the mower by simply, temporarily engaging a single actuating member and subsequentially using the actuating member to lift or lower the deck to a desired position before releasing the actuating member, whereafter the height of the deck is maintained at the desired position relative to the ground. Such an arrangement would obviate the need to independently adjust the deck height at each one of the four wheels of the mower one at a time.

It is yet another object of the present invention to provide a deck height adjustment mechanism for a lawn mower which allows the deck height to be adjusted at all four wheels of the lawn mower simultaneously with a single hand, and which is even simpler in construction and lower in cost to manufacture than previously existing deck height adjustment mechanisms.

It is yet another object of the present invention to provide a deck height adjustment mechanism for a lawn mower having a manually, grippable actuating member which allows the height of the deck to be adjusted simultaneously at all four wheels of the lawn mower when the operator grippingly engages the actuating member while simultaneously lifting up on or lowering the deck to the desired height with the same hand. When the deck is positioned at the desired height, releasing the actuating member locks the position of the deck, and thus the height of the cutting blade, at the desired position simultaneously at all four wheels of the mower.

SUMMARY OF THE INVENTION

The above and other objects are accomplished by a lawn mower having an improved deck height adjustment mechanism in accordance with a preferred embodiment of the present invention. In the preferred embodiment, the present invention includes an index plate which is fixedly secured to one of an offset rear axle or an offset front axle. Merely as an example, in the preferred embodiment the index plate is fixedly secured to the rear axle. An actuating assembly having means for engaging the index plate and holding it stationary relative to the deck of the lawn mower is provided and positioned above the deck to even further increase the convenience of access to the user. The operator can quickly and easily uncouple (i.e., release) the actuating assembly from engagement with the index plate by gripping the actuating assembly and easily and quickly re-engage the index plate by releasing the actuating assembly.

The index plate is mechanically coupled with the other one of the front or rear offset axles by a linkage member such that rotational movement of the index plate causes a corresponding rotational movement at the other one of the front or rear axles. In the preferred embodiment, the linkage member is coupled intermediate the index plate and the offset front axle of the lawn mower. Each of the front and rear offset axles further extend width-wise across the deck to support a pair of the wheels of the mower. In the preferred embodiment, the rear offset axle supports the rear wheels of the lawn mower for rotational movement relative to the deck, while the front offset axle supports the front wheels of the lawn mower for rotational movement relative to the deck.

When the operator grippingly engages the actuating assembly, the actuating assembly is drawn out of engagement with the index plate, thus allowing it to rotate in accordance with the offset rear axle, and thus allowing the vertical position of the two rear wheels to be adjusted relative to the deck. Simultaneously, the linkage member couples the rotational movement of the index plate to the offset front axle, thus causing a corresponding rotational movement of the offset front axle. The simultaneous rotational movement of the front and rear offset axles thus adjusts the height of the entire deck at all four wheels relative to a ground surface supporting the four wheels.

When the operator achieves the desired deck height, the operator releases the actuating assembly which causes it to reengage with the index plate. This maintains the index plate stationary relative to the deck and prevents further vertical movement of the four wheels. In this manner, the height of the deck, and thus the height of the cutting blade relative to the ground surface, can be quickly, easily and conveniently controlled by the use of a single hand which simultaneously engages the actuating assembly and either lifts or lowers the deck while the actuating assembly is held in its engaged position.

In a preferred embodiment, the index plate further includes a pair of shoulder portions spaced vertically apart from one another to define first and second mounting positions for the offset rear axle. In the first mounting position, the offset rear axle is positioned to accept a first diameter wheel, for example, a wheel having a diameter of 7 inches. When the offset rear axle is fixedly secured to the second shoulder portion, and therefore in the second position, the offset rear axle is held in a position closer to a bottom-most edge of the deck to provide for a greater minimum ground clearance when a smaller diameter wheel is used, such as a six inch diameter wheel. Thus, the first and second shoulder portions enable the offset rear axle to be secured in two positions without any additional component parts being secured to the index plate. Thus, a single index plate can be used for mowers having different rear wheel diameters. It will be appreciated that this represents an important manufacturing advantage in that multiple index plates need not be manufactured to accommodate wheels of differing diameters.

In a preferred embodiment, the linkage member further includes an indicator which moves in accordance with the movement of the linkage member to provide a visual indication to the operator as to the current deck height position. A preferred embodiment of the lawn mower includes a shroud having a portion adjacent the indicator which includes suitable indicia for enabling the current deck height setting of the lawn mower to be read.

It is a principle advantage of the deck height adjustment mechanism of the present invention that an even simpler, less costly height adjustment mechanism having fewer component parts over prior developed mechanisms is provided. The deck height adjustment mechanism of the present invention provides a further advantage of not adding appreciably to the overall cost, size or weight of the lawn mower while significantly increasing the ease and convenience with which the deck height may be adjusted by an operator.

BRIEF DESCRIPTION OF THE DRAWINGS

The various advantages of the present invention will become apparent to one skilled in the art by reading the following specification and subjoined claims and by referencing the following drawings in which:

FIG. 4 is an exploded perspective view of the component parts of the deck height adjustment mechanism;

FIG. 9 is a side view of the lawn mower of FIG. 8 showing the orientation of the index plate and linkage member when the deck is adjusted to its minimum height position.

DETAILED DESCRIPTION OF THE PREFERRED EMBODIMENTS

Figures 1, 2:
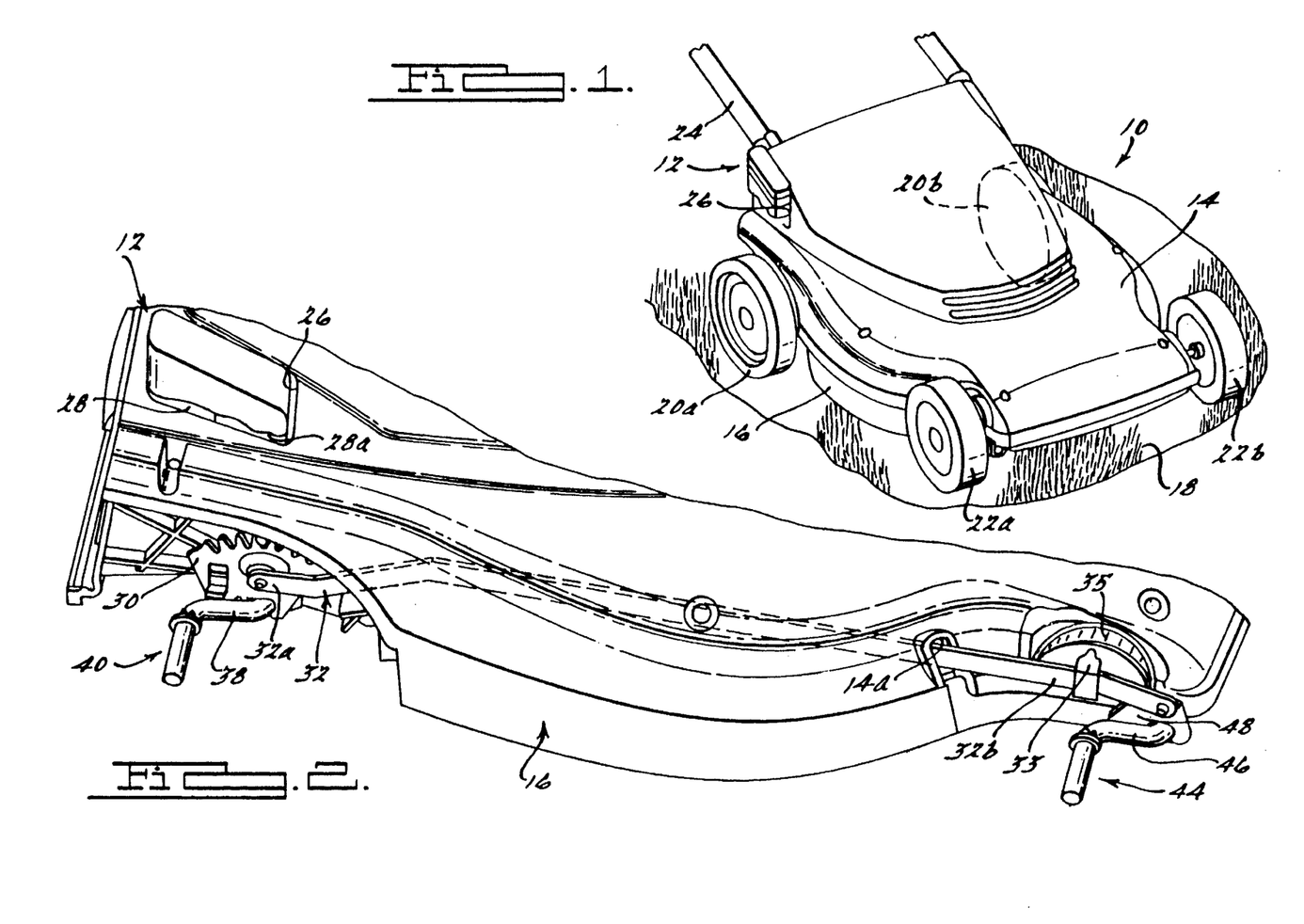
FIG. 1 is a perspective view of a lawn mower incorporating a deck height adjustment mechanism in accordance with the present invention.
FIG. 2 is a perspective, fragmentary view of a portion of the lawn mower shown in FIG. 1 illustrating the index plate and actuating member in greater detail.

Referring to FIG. 1, a vegetation cutter in the form of a lawn mower 10 is shown which incorporates a deck height adjustment mechanism 12 in accordance with a preferred embodiment of the present invention. The lawn mower generally includes a removable shroud 14 secured to a deck 16. The deck is supported above a ground surface 18 by a pair of rear wheels 20a and 20b and a pair of front wheels 22a and 22b. The lawn mower 10 is traversed over the ground surface 18 by the operator gripping a handle member 24 near a top portion thereof (not shown) and pushing the lawn mower, if the lawn mower is not of the self-propelled variety, or simply steering the lawn mower as needed if the lawn mower is of the self-propelled variety. It will be appreciated that while the mechanism of the present invention has been described in connection with a lawn mower, that the mechanism 12 could easily be adapted with little or no modification for use with a wide variety of vegetation cutters having at least two wheels. The mechanism 12 can provide quick and easy height adjustment on virtually any form of vegetation cutter where it is important to have corresponding height adjustments made at the front and rear wheels of the cutter. Still further, the adjustment mechanism 12 of the present invention can be used with little or no modification with cordless (i.e., battery powered) mowers, "corded" mowers driven by an AC power source, bagging mowers, discharge mowers, mulching mowers and self-propelled mowers, or a combination thereof.

With further reference to FIGS. 1 and 2, the shroud 14 includes an opening 26 through which an actuating member 28 of the deck height adjustment mechanism 12 protrudes. As will be described more fully in connection with FIGS. 2–9, the deck height adjustment mechanism 12 allows the operator to adjust the height of the deck 16 relative to the ground surface 18 by merely grippingly urging a gripping portion 28a of the actuating member 28 upwardly in a generally linear path of movement, relative to the ground surface 18, and holding the member 28 engaged while lifting or lowering the deck 16 with the same hand. Thus, there is no need to make separate deck height adjustments at all four wheels of the mower 10 as would be required with most prior deck height adjustment systems. By using a single hand, the operator is able to simultaneously adjust the deck height at all four wheels 20a, 20b and 22a, 22b of the lawn mower 10. The actuating member 28 is further positioned well above the rear wheel 20a so that the operator is not required to bend over to a significant degree to make a deck height adjustment. The positioning of the actuating member 28 therefore adds significantly to the comfort and convenience of making height adjustments of the deck 16.

Figure 3:
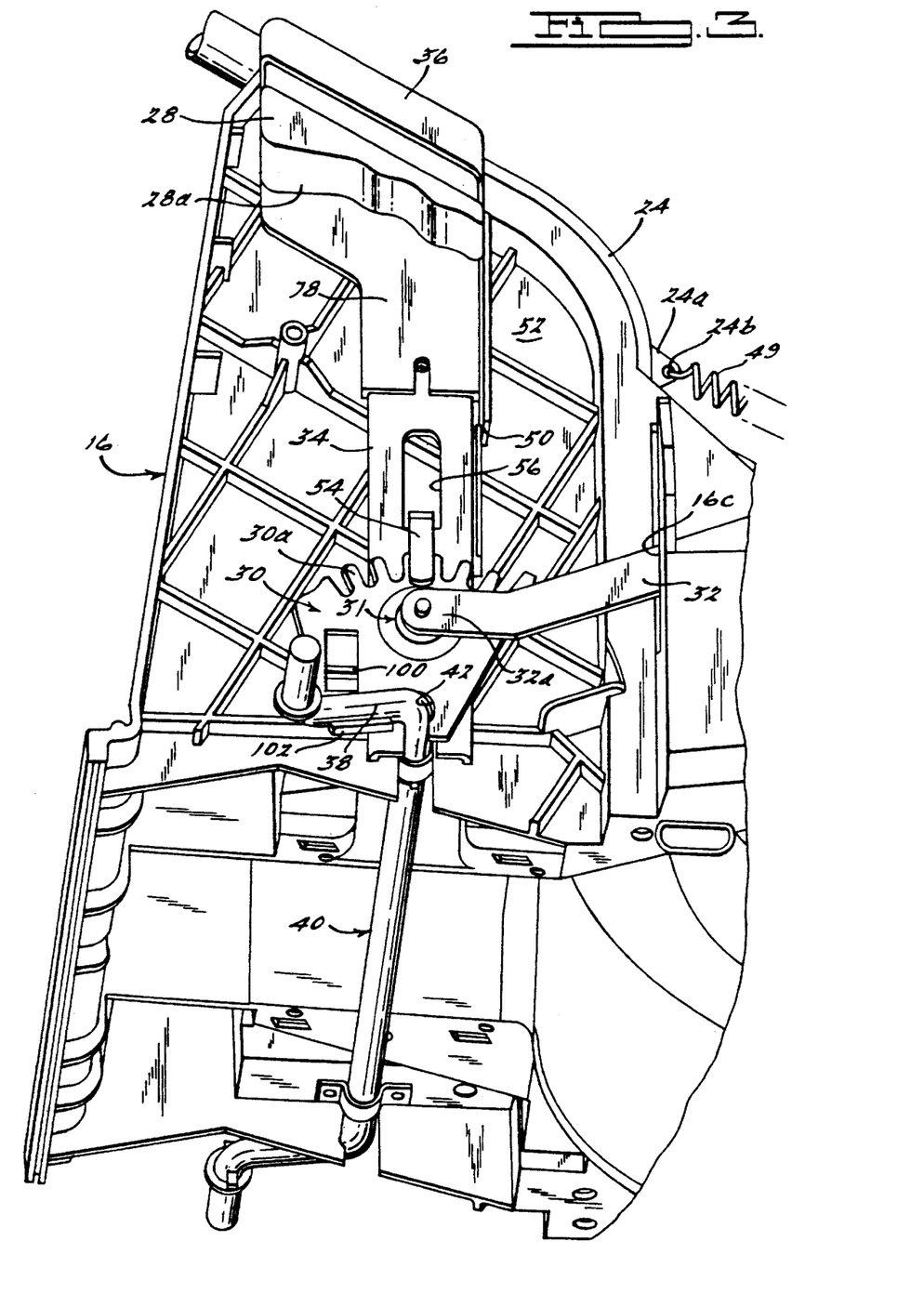
FIG. 3 is a perspective view of a rear portion of the deck of the lawn mower in FIG. 2 showing more clearly the shape of the offset rear axle.

Referring now to FIGS. 2–4, the component parts of the deck height adjustment mechanism 12 can be seen even more clearly. The mechanism 12 generally includes an index plate 30, a linkage member 32 pivotally secured to a pivotal mounting portion 31 of the index plate 30 at an aperture 32d of a first end 32a of the linkage member 32, an actuating assembly comprising an engaging member 34 and the actuating member 28, and a palm rest 36. The index plate 30 is physically coupled to an offset portion 38 of an offset rear axle 40 of the lawn mower 10, as shown in FIG. 3. The index plate 30 is preferably fixedly secured, such as by welding, to the offset portion 38 and includes a notched portion 42 for receiving a portion of the offset rear axle 40. By this arrangement, rotational movement of the offset portion 38 of the rear axle 40 causes a corresponding rotational movement of the index plate 30. With further reference to FIG. 2, a second end 32b of the linkage member 32 extends through an opening 14a in the shroud 14 and through an opening 16c in the deck 16, as shown in FIG. 3. The linkage member 32 has fixedly secured thereto a height indicator 33. The height indicator is shown disposed closely adjacent where the front wheel 22a would be mounted, but it will be appreciated that its placement could just as well be at almost any point along the length of the linkage member 32. It will also be appreciated that the height indicator 33 could just as well be placed on any other moving component part of the adjustment mechanism 12, such as the index plate 30 or a bracket 48 (to be discussed) associated with a front axle 44 (also to be discussed). In these instances, any indicia also used to help visually indicate the present deck 16 height will preferably be located closely adjacent the height indicator 33 on a stationary component of the lawn mower 10.

With further reference to FIG. 2, the shroud 14 also preferably includes some form of indicia 35, such as a label, disposed on a portion thereof for cooperating with the indicator 33 to provide an immediate visual indication as to the height that a cutting blade (not shown) housed underneath the deck 16 is presently set at for any given deck height. As will be appreciated, the indicia 35 could be in the form of inches, millimeters, etc.

With specific reference to FIG. 3, the entire construction of the rear axle 40 can be seen. Since the rear axle 40 is a single-piece component which extends across the entire width of the deck 16 and supports both of the rear wheels 20a and 20b, rotational movement of the offset portion 38 allows the vertical height of both rear wheels 20a and 20b to be simultaneously varied relative to the deck 16, in addition to varying the position of the index plate 30 relative to the deck 16.

With further brief reference to FIG. 2, it will be appreciated that an offset front axle 44 is provided for supporting the two front wheels 22a and 22b. Fixedly secured (as by welding) to an offset portion 46 of the front axle 44 is a bracket 48 similar in shape to the index plate 30. The second end 32b of the linkage member 32 is pivotally coupled via an aperture 32e to a pivotal mounting portion 48a of the bracket 48 such that rotational movement of the index plate 30 causes a corresponding rotational movement of the offset portion 46 of the offset front axle 44. This, in turn, causes the vertical position of both front wheels 22a and 22b, relative to the deck 16, to be changed in accordance with the degree of vertical adjustment provided at the rear wheels 20a and 20b. As shown in FIG. 3, it will be appreciated that the construction of the offset front axle 44 is similar to the offset rear axle 38 in order to provide relatively consistent height adjustment from front to back of the mower 10 throughout the adjustment range.

Figure 8:
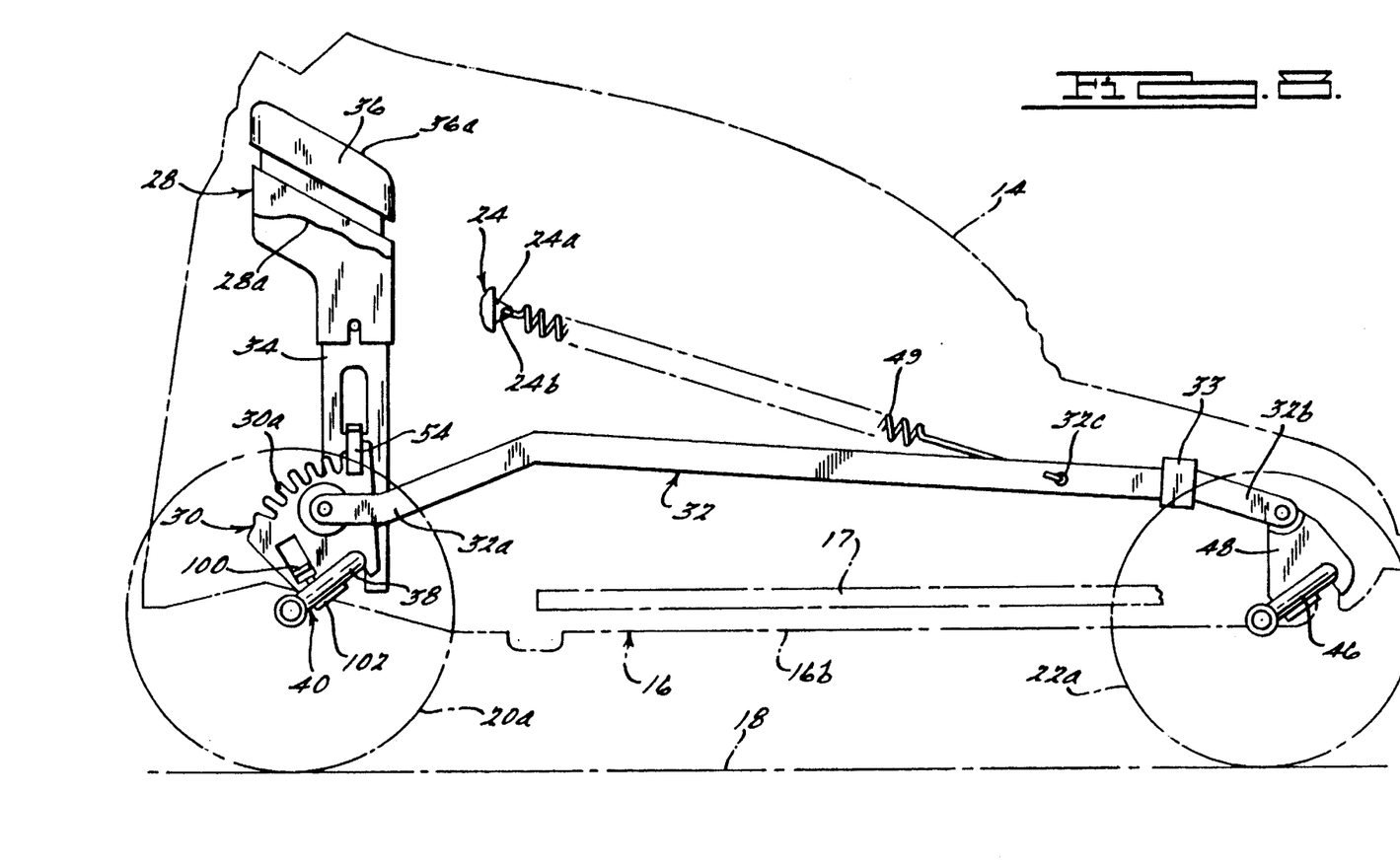
FIG. 8 is a side view of the deck of the lawn mower shown in FIG. 1 illustrating in broken-away fashion the orientation of the index plate and linkage member when the deck is adjusted to its maximum height position relative to the ground surface.

With brief reference to FIGS. 8 and 9, to aid in lifting the deck 16 during an adjustment, an elongated coil spring 49 is preferably included. The spring 49 is secured to the linkage member 32 through an aperture 32c, and, via an aperture 24b, to a tab portion 24a (FIG. 3) of one handle bar of the handle member 24. The biasing force of the spring 49, which is under constant tension, assists in urging the linkage member 32 to the left in the drawings of FIGS. 3, 8 and 9, and therefore rotating the index plate 30 counter-clockwise to thus help lift the deck 16 when the actuating member 28 is lifted to its disengaged position. This operation will be described in greater detail in connection with FIG. 8 and the operation of the mechanism 12.

With continued reference to FIGS. 3, 4, 5 and 7, the engaging member 34 is disposed for sliding movement within a channel 50 (FIG. 3), integrally formed in a sidewall portion 52 of the deck 16. The engaging member 34 includes a "pawl" 54 formed from a punched out section 56 thereof. The pawl 54 further includes a tooth 54a protruding laterally therefrom, as best seen in FIG. 4. The pawl 54 is positioned such that it is disposed closely adjacent a plurality of teeth 30a of the index plate 30 so that when the engaging member 34 is urged slidably into its lowermost position, the tooth 54a is in interlocking engagement between an adjacent pair of teeth 30a to thus maintain the index plate 30 stationary. The teeth 30a define a plurality of predetermined cutting blade height positions. A slot 54b is also provided to allow a lower end portion 54c to fit over a portion of the offset rear axle 40, to thus provide horizontal stability of the engaging member 34, while allowing vertical sliding movement.

Figures 5, 7:
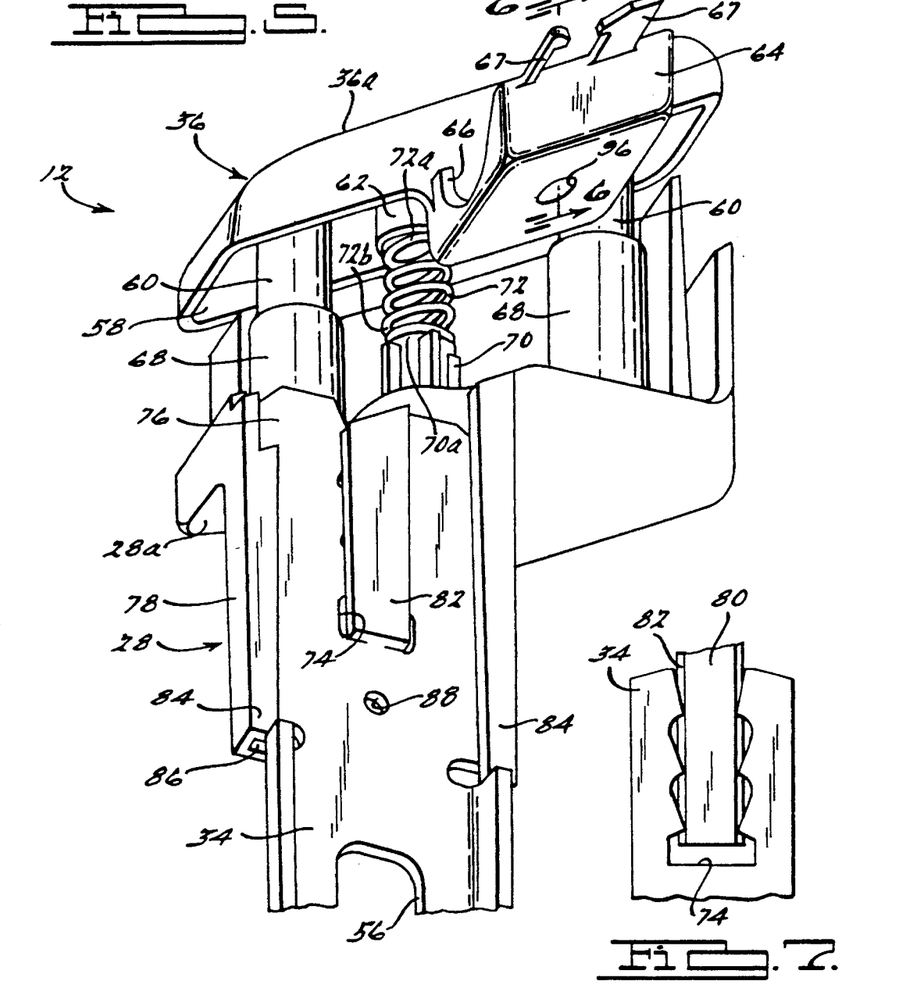
FIG. 5 is a rear perspective view of the actuating member, engaging member and palm rest.
FIG. 7 is a front view of a portion of the engaging member lockingly intergaging the arm portion of the actuating member.

With specific reference to FIG. 5, the coupling of the engaging member 34 and the actuating member 28 can be seen, together with the construction of the palm rest 36 relative to the deck 16. The palm rest 36 includes an upper surface portion 36a against which a palm of a hand is placed when the actuating member 28 is to be engaged. The palm rest 36 includes a generally hollow bottom portion 58 from which a pair of integrally formed outward locating posts 60 and a centrally disposed boss portion 62 project. A mounting portion 64 projects generally laterally of the locating posts 60 and includes a semicircular cut-out 66 and a pair of somewhat flexible arm members 67. The palm rest 36 is integrally formed as a single-piece component, and preferably from a high-strength plastic.

With continued reference to FIG. 5, the actuating member 28 includes a pair of tubular locating posts 68 positioned to slidably accept the locating posts 60, and a central mounting post 70 positioned between the tubular locating posts 68. A biasing member in the form of a coil spring 72 is positioned between the palm rest 36 and the actuating member 28 such that an upper end 72a is held within the central boss portion 62, and a lower end portion 72b fits over an upper portion 70a of the central mounting post 70. In this manner, the spring 72 is held captively under compression between the palm rest 36 and the actuating member 28 when the height adjustment mechanism 12 is assembled, and provides a biasing force against the actuating member 28 to hold the pawl 54 in a normally downwardly biased position in engagement with the index plate 30.

With further reference to FIGS. 4, 5 and 7, the engaging member 34 includes a cut-out portion 74 at an upper end portion 76 thereof. When assembling the actuating member 28 and the engaging member 34, the upper end portion 76 is slidably inserted into a main body portion 78 of the actuating member 28. With specific reference to FIG. 7, the actuating member 28 includes a tapered rib portion 80 projecting from a locking arm member 82 which is integrally formed with the main body portion 78 of the actuating member 28. The tapered rib portion 80 is shaped so as to lockably engage the cut-out portion 74 as the upper end portion 76 of the engaging member 34 is slidably inserted into the main body portion 78 of the actuating member 28.

With specific reference to FIG. 5, to further help maintain the coupling of the engaging member 34 with the actuating member 28, a pair of lip members 84 are also preferably integrally formed with the main body portion 78 so as to form a channel 86 into which the upper end portion 76 of the engaging member 34 is inserted. Optionally, an aperture 88 is provided in the upper portion 76 of the engaging member 34 together with a slot 90 (FIG. 4) in the main body portion 78 of the actuating member 28. A threaded fastener may be inserted through the slot 90 and the aperture 88 to even more securely hold these two component parts together.

Figure 6:
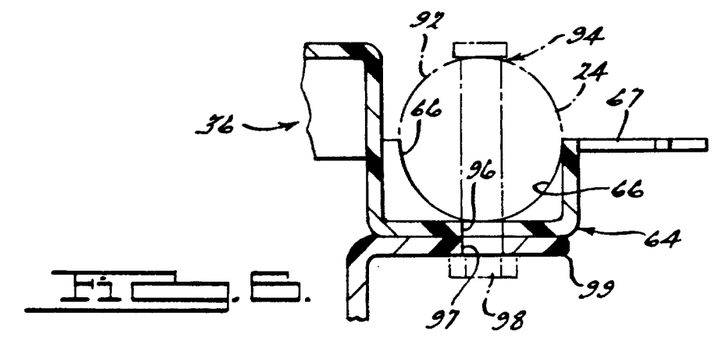
FIG. 6 is a cross-sectional view in accordance with section line 6—6 of FIG. 5 showing the coupling and capturing of the palm rest between a tubular handle member of the lawn mower and the handle support area of the deck.

With specific reference to FIG. 6, the mounting portion 64 of the palm rest 36 is coupled to a portion 92 of the tubular handle member 24 via a conventional threaded fastener 94 (or other form of fastener), shown in phantom, which extends through apertures (not shown) in the tubular handle member, through an aperture 96 in the mounting portion 64, and through an aperture 97 in a handle support portion 99 of the deck 16. A conventional threaded nut 98 or other fastener may be used together with the threaded fastener 94 to securely hold the palm rest 36 to the portion 92 of the handle member 24. The arm portions 67 may be used to help engage one or more electrical cables running parallel to the length of the tubular handle member 24.

Referring now to FIGS. 2, 3 and 8, to adjust the deck height of the lawn mower 10 to a higher position of height relative to the ground surface 18, the operator places his/her palm on the palm rest 36, places the fingers of the same hand over the gripping portion 28a of the actuating member 28 and lifts up on the actuating member 28 against the biasing force of the spring 72, thus causing the pawl 54 to be slidably released from engagement with the teeth 30a of the index plate 30. While the engaging member 34 and the pawl 54 are held in an upper, released position by the operator, the operator may lift upwardly on the deck 16 via the actuating member 28 with the same hand. The biasing force provided by the spring 49 provides an assist to the operator in lifting the weight of the deck 16. As the operator lifts upwardly, the index plate 30 is urged rotatably in a counter-clockwise direction, as viewed in FIG. 8, by the rotation of the offset portion 38 of the offset rear axle 40. Simultaneously, the linkage member 32 urges the bracket 48 counter-clockwise a corresponding degree which, in turn, causes the offset portion 46 of the offset front axle 44 to be rotated by a corresponding degree. In this manner, the axis of rotation of the rear wheels 20a and 20b and the axis of rotation of the front wheels 22a and 22b are lowered relative to a lower edge surface 16b of the deck 16. Put differently, the lower edge surface 16b of the deck 16, and thus a cutting blade 17 housed within the deck 16, are raised relative to the axis of rotation of all four wheels 20a, 20b and 22a, 22b of the lawn mower 10. The orientation of the wheels 20a, 20b and 22a, 22b, the index plate 30, the engaging member 34, the actuating member 28 and the linkage member 32 are shown in FIG. 8 when the deck 16 is in its maximum height position relative to the ground surface 18.

To maintain the deck 16 at the position shown in FIG. 8, the operator merely releases the actuating member 28 once the deck is positioned at the desired height relative to the ground surface 18. Releasing the actuating member 28 causes the actuating member 28, and thus the pawl 54, to be urged downwardly by the spring 72 to engage between the right-most pair of teeth 30a of the index plate 30, as viewed in FIG. 8. The index plate 30, and thus the axis of rotation of all four wheels 20a, 20b and 22a, 22b will be maintained at this desired position until the operator readjusts the height of the deck 16.

With brief reference to FIG. 9, the orientation of the above mentioned components and the position of the deck 16 relative to the ground surface 18 is shown with the deck 16 height adjusted to its lower most position relative to the ground surface 18. This is achieved by gently urging the palm of the hand positioned on palm rest 36 downwardly, while holding the actuating member 28 engaged with the fingers of the same hand. In the lower most position, the index plate 30 is held in its clockwise-most position by engagement of the pawl 54 between the left-most pair of teeth 30a of the index plate 30, after the operator releases the actuating member 28.

With brief reference again to FIGS. 3, 4 and 8, the index plate 30, in the preferred embodiment, includes an upper shoulder portion 100 defining a first axle position and a lower shoulder portion 102 defining a second axle position. In the figures, the offset portion 38 of the offset rear axle 40 is shown fixedly secured to the lower shoulder portion 102, which places the rear wheels 20a, 20b in the second position relative to the deck 16, and thus positions the deck 16 in a second position relative to the ground surface 18. When the offset portion 38 is secured fixedly to the first shoulder portion 100, the rear wheels 20a, 20b are supported in the first position relative to the deck 16 which positions the deck 16 in a first position relative to the ground surface 18 which is closer to the ground surface for any given position of the index plate 30 than it would be when the offset portion 38 is secured to the second shoulder portion 102. Accordingly, a single index plate 30 may be used with wheels of differing diameters provided it is known in advance of assembly of the lawn mower 10 the diameter of the rear wheels 20a, 20b to be employed. As an example, when seven inch diameter rear wheels 20a, 20b are used, the offset rear axle 38 may be fixedly secured to the upper shoulder portion 100. When a six inch diameter wheel is to be used, the offset rear axle 38 may be fixedly secured to the lower shoulder portion 102, thus allowing a similar degree of minimum ground clearance to be provided as when the larger diameter rear wheels 20a, 20b are used. It will be appreciated by those of ordinary skill in the art that this feature represents a significant manufacturing advantage in that only a single index plate 30 need be used for the lawn mower 10, regardless if the lawn mower 10 is to be assembled with rear wheels 20a, 20b having diameters which may vary from between two predetermined, desirable wheel diameters. This further obviates the need to modify the linkage member 32 and the deck height indicator 33 to ensure consistent deck height indications when rear wheels 20a, 20b having differing diameters are employed.

From the above, it will be appreciated that the height adjustment mechanism 12 of the lawn mower 10 represents a significant improvement over prior designs by requiring fewer component parts, generally less complicated construction and generally greater ease of operation. The deck height adjustment mechanism 12 of the present invention further does not add appreciably to the overall cost of the lawn mower 10, nor does it tangibly increase the overall outer dimensions of the lawn mower 10 or its overall weight. Because of the simplified construction of the mechanism 12, reliability of operation is also improved.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A vegetation cutter having a deck, a cutting blade supported by said deck and at least a first wheel associated with said deck for allowing the deck to be traversed over a ground surface by an operator, the improvement comprising:

a deck height adjustment mechanism for adjusting a height of said deck, and therefore said cutting blade, to a selected one of a plurality of predetermined positions, said deck height mechanism including:

an index member operably associated with said at least one wheel and said deck, and defining said plurality of predetermined positions;

a palm rest mounted above said deck, said palm rest member having a recess and an upper portion adapted to support the palm of a hand of a user;

an actuating assembly operably associated with said index member and slidably coupled to said deck, and engageable with the fingers of said hand while the palm of said hand is positioned on said upper surface portion of said palm rest, and liftable slidably generally vertically in a generally linear path from a first position wherein said index member, and therefore said deck, is held stationary at a first level relative to said ground surface, to a second position wherein said deck is positioned at a second level relative to said ground surface, said deck being positioned from said first level to said second level by retracting said fingers while resting said palm on said palm rest to withdraw a portion of said actuating assembly into said recess and to cause said index member to be substantially simultaneously released from engagement with said actuating assembly and urging said deck towards or away from said ground surface with said hand while said actuating assembly is held engaged by said fingers, thereby adjusting said index member to a different one of said predetermined positions, to therefore adjust a height of said cutting blade relative to said ground surface.

2. The vegetation cutter of claim 1, wherein said actuating assembly includes:

an actuating member moveable generally vertically slidably relative to said deck between said first and second positions and grippable with said fingers of said hand;

an engaging member secured to said actuating member for engaging said index member when said actuating member is in said first position; and a biasing member for biasing said actuating member into said first position when said operator releases said fingers from said actuating member, to therefore urge said engaging member into engagement with said index member.

3. The vegetation cutter of claim 1, further comprising a biasing member associated with said index member for generating a lifting force on said deck to aid in adjustably positioning said deck when said actuating assembly is urged into said second position.

4. The vegetation cutter of claim 1, further comprising:

a height indicator associated with said index member for providing an immediate visual indication of the height at which said cutting blade is set at.

5. A vegetation cutter having a cutting blade, a deck for enclosing said cutting blade and supporting said cutting blade for rotational movement relative to said deck, a handle member secured to said deck for enabling an operator to maneuver said vegetation cutter, and a first plurality of wheels supported for rotational movement relative to said deck via an axle, the improvement comprising:

a deck height adjustment mechanism for allowing an operator to adjust a height of said deck to a plurality of positions relative to a ground surface and, therefore, a height of said cutting blade to a plurality of positions relative to said ground surface, with a single hand;

said deck height adjustment mechanism including:

an index member fixedly associated with said axle and being moveable rotatably relative to said deck with said axle such that rotation in a first direction causes said first plurality of wheels of said vegetation cutter to be raised relative to said deck and that movement of said index member rotatably in a second direction causes said wheels to be lowered relative to said deck;

a palm rest fixedly positioned above said deck closely adjacent said handle member, said palm rest having a recess formed therein;

an actuating member disposed above said deck and closely adjacent said palm rest and moveable in a generally linear motion with the fingers of a hand of said operator while the palm of said hand is resting on said palm rest from a first position wherein said actuating member cooperates with said index member to hold said index member, and therefore said axle, stationary relative to said deck, into a second position in a generally linear sliding motion wherein at least a portion of said actuating member is disposed within said recess and said actuating member allows said index member to rotate, thereby allowing said axle to be repositioned relative to said deck by urging said actuating member upwardly and downwardly relative to said ground surface, and therefore enabling said cutting blade to be raised or lowered to a desired height relative to said ground surface while said actuating member is grippingly held in said second position; and a biasing member for urging said actuating member into said first position when said operator releases said actuating member to thereby hold said index member stationary relative to said deck, and said deck vertically stationary relative to said ground surface.

6. The vegetation cutter of claim 5, further comprising:

an offset front axle;

said offset front axle supporting for rotational movement at least one front wheel; and a linkage member coupled to said index member and to said offset front axle for causing said deck to be raised or lowered relative to both said first plurality of wheels and said front wheel simultaneously in accordance with rotational movement of said index member.

7. The vegetation cutter of claim 6, further including:

a shroud having a portion including deck height indicia; and wherein said linkage member includes a blade height indicator associated therewith which is moveable in accordance with said linkage member for providing a visual indication, in connection with said deck height indicia, of a setting of the height of said cutting blade relative to said ground surface.

8. The vegetation cutter of claim 5, wherein said actuating member includes a manually grippable actuating member disposed for vertically sliding movement relative to said deck; and an engaging member coupled thereto having a pawl for releasably engaging said index member when said actuating member is in said first position, thus maintaining said index member stationary relative to said deck when said actuating member is not being manually engaged by said operator.

9. The vegetation cutter of claim 5, wherein said index member includes a first protruding shoulder member for supporting a portion of said axle in a first position when each of said wheels has a first diameter; and wherein said index member includes a second protruding shoulder portion for supporting a portion of said axle in a second position when each of said wheels has a second diameter.

10. A mower having a deck, a cutting blade supported for rotational movement relative to said deck, an offset rear axle for supporting a pair of rear wheels rotatably relative to said deck, an offset front axle for supporting a pair of front wheels rotatably relative to said deck, and a linkage member for coupling said front and rear axles and a handle member secured to said deck for enabling an operator to maneuver said mower, the improvement comprising:

a manually engageable deck height adjustment mechanism for allowing an operator to adjust a height of said deck, and therefore said cutting blade, relative to each of said four wheels simultaneously with a single hand, said deck height adjustment mechanism including:

an index plate having a plurality of teeth each defining a specific deck height position relative to said wheels and to a ground surface to be traversed by said mower, said index plate further being fixedly secured to at least one of said front or rear offset axles;

a palm rest member fixedly secured to a portion of said handle member at a position above one of said rear wheels, said palm rest having a recess and an upper portion adapted to support the palm of said hand of said operator;

an actuating assembly disposed for generally vertical linear sliding movement relative to said deck, said actuating assembly including:

an engaging member having a pawl positioned adjacent to said index plate and interengageable with said teeth of said index plate to maintain said index plate, and therefore said one of said offset front or rear axles, stationary when said actuating assembly is not being manually engaged by said operator, and to allow said index plate, and therefore said one of said front or rear axles, to rotate when said engaging member is urged out of inter-engagement with said teeth of said index plate;

an actuating member having a portion grippable with the fingers of said hand while the palm of said hand is resting on said palm rest, said actuating member being secured to said engaging member and slidably secured to said deck and having a portion adapted to be withdrawn into said recess in said palm rest when said actuating member is grippingly urged from a first position into a second position, said pawl of said engaging member being urged out of contact with said teeth of said index plate when said actuating member is grippingly urged into said second position, whereby said rear wheels can be adjustably positioned relative to said deck by urging said deck, via said actuating member, upwardly and downwardly with said hand; and a spring disposed between said palm rest and said actuating member for urging said pawl of said engaging member into contact with said index plate when said actuating member is released by said operator to thereby lock said index plate at a desired position, and thereby maintain said deck at a desired level relative to said ground surface.

11. The mower of claim 10, further comprising a linkage member pivotally coupled to said index plate and to a portion of the other one of said front or rear axles.

12. The mower of claim 10, wherein said index plate includes a first shoulder portion and a second shoulder portion;

said first shoulder portion defining a first position at which said one of said front or rear offset axles is secured when wheels having a first diameter are couple to said offset axle associated with said index plate;

said second shoulder defining a second position at which said offset axle associated with said index plate is secured when wheels having a second diameter differing from said first diameter are coupled to said offset axle associated with said index plate.

13. The mower of claim 10, wherein said linkage member includes an indicator for providing a visual indication as to a presently adjusted height of said cutting blade relative to said ground surface.

14. The mower of claim 10, further comprising:

a biasing member coupled to said linkage member for providing a biasing force to assist in lifting said deck while said actuating assembly is engaged.

15. A mower having a deck, a cutting blade housed within said deck and supported by said deck, an offset axle for supporting a pair of wheels rotatably thereon, an index plate having a plurality of teeth for defining a plurality of independent deck height positions, and therefore a plurality of cutting blade height positions relative to a ground surface, said index plate being fixedly secured to a portion of said offset axle such that rotational movement of said offset axle causes a corresponding rotational movement of said index plate, the improvement comprising:

a deck height adjustment mechanism for enabling an operator to adjust a vertical height of said deck, and therefore a vertical height of said cutting blade relative to said ground surface traversed by said mower, through the use of a single hand of the operator, said deck height adjustment mechanism including:

a palm rest disposed generally above one of said wheels and fixedly relative to said deck, said palm rest having an upper surface portion adapted to support said hand of said operator and a recess formed therein;

a manually grippable actuating member disposed for sliding, generally linear vertical movement relative to said deck toward said palm rest when grippingly engaged by the fingers of said hand of said operator so as to be at least partially disposed within said recess while the palm of said hand rests on said palm rest;

an engaging member having a pawl disposed adjacent said teeth of said index plate such that when said actuating member is in a first, non-engaged position said pawl engages said teeth to maintain said index plate stationary relative to said deck, and when said actuating member is urged into a second position by grippingly urging said actuating member toward said palm rest said pawl is caused to be urged vertically linearly away from said index plate, thereby allowing said index plate and said axle to rotate relative to said deck, thereby enabling adjustable positioning of said deck relative to said ground surface by said operator urging said actuating member upwardly or downwardly once said second position is reached.

16. The mower of claim 15, wherein said index plate includes a first shoulder portion and a second shoulder portion;

said first shoulder portion being adapted to be fixedly secured to a portion of said offset axle when said wheels have a first diameter; and said second shoulder portion being adapted to be secured to a portion of said offset axle when said wheels have a second diameter different from said first diameter.

17. The mower of claim 15, wherein said mower includes a shroud having indicia indicative of a cutting blade height presently set relative to said ground surface; and an indicator operably associated with said index plate for cooperating with said indicia to provide a visual indication to said operator as to said presently adjusted cutting blade height.

18. The mower of claim 15, further comprising:

a second offset axle for supporting a plurality of wheels;

a bracket fixedly secured to a portion of said second offset axle;

a linkage member pivotally coupled to said index plate and to said bracket such that adjustable positioning of said index plate causes simultaneous adjustable positioning of said offset axle and said offset front axle.

19. The mower of claim 15, further comprising:

a first biasing member associated with said actuating assembly for biasing said engaging member into engagement with said index plate when said actuating member is not being grippingly engaged by said operator.

20. The mower of claim 15, further comprising a second biasing member operably associated with said index plate for assisting said operator in lifting said deck when said actuating member is grippingly engaged by said operator.

21. A vegetation cutter having a deck, a cutting blade supported by said deck and at least a first wheel supported by an axle for supporting said deck above a ground surface, the improvement comprising:

a deck height adjustment mechanism for adjusting a height of said deck, and therefore said cutting blade, said deck height adjustment mechanism including:

a palm rest positioned above said deck, said palm rest having a recess formed therein;

an actuating member adapted to be urged slidably linearly between a first position and a second position by the fingers of a hand of an operator while the palm of said hand is resting on said palm rest, said actuating member being at least partially disposed within said recess when said actuating member is in said second position;

an engaging member coupled to said actuating member and moveable between an engaged position relative to said axle when said actuating member is in said first position, wherein said axle is held stationary, and a disengaged position relative to said axle when said actuating member is grippingly urged by said fingers into said second position, wherein said axle may be rotatably adjustably positioned relative to said deck;

said height of said deck being adjustable by urging said deck towards or away from said ground surface while said actuating member is held in said second position, thus causing said axle to be repositioned relative to said deck; and means for biasing said actuating member into said first position when said actuating member is released by said operator to thereby cause said engaging member to be urged into engagement with said axle, to thus hold said axle stationary relative to said deck, and therefore a height of said deck fixed relative to said ground surface.

* * * * *